July 23, 1940.  H. BRIAND  2,209,149
DEVICE FOR REGULATING THE ACTION OF BRAKES
Filed Feb. 24, 1939  2 Sheets-Sheet 1
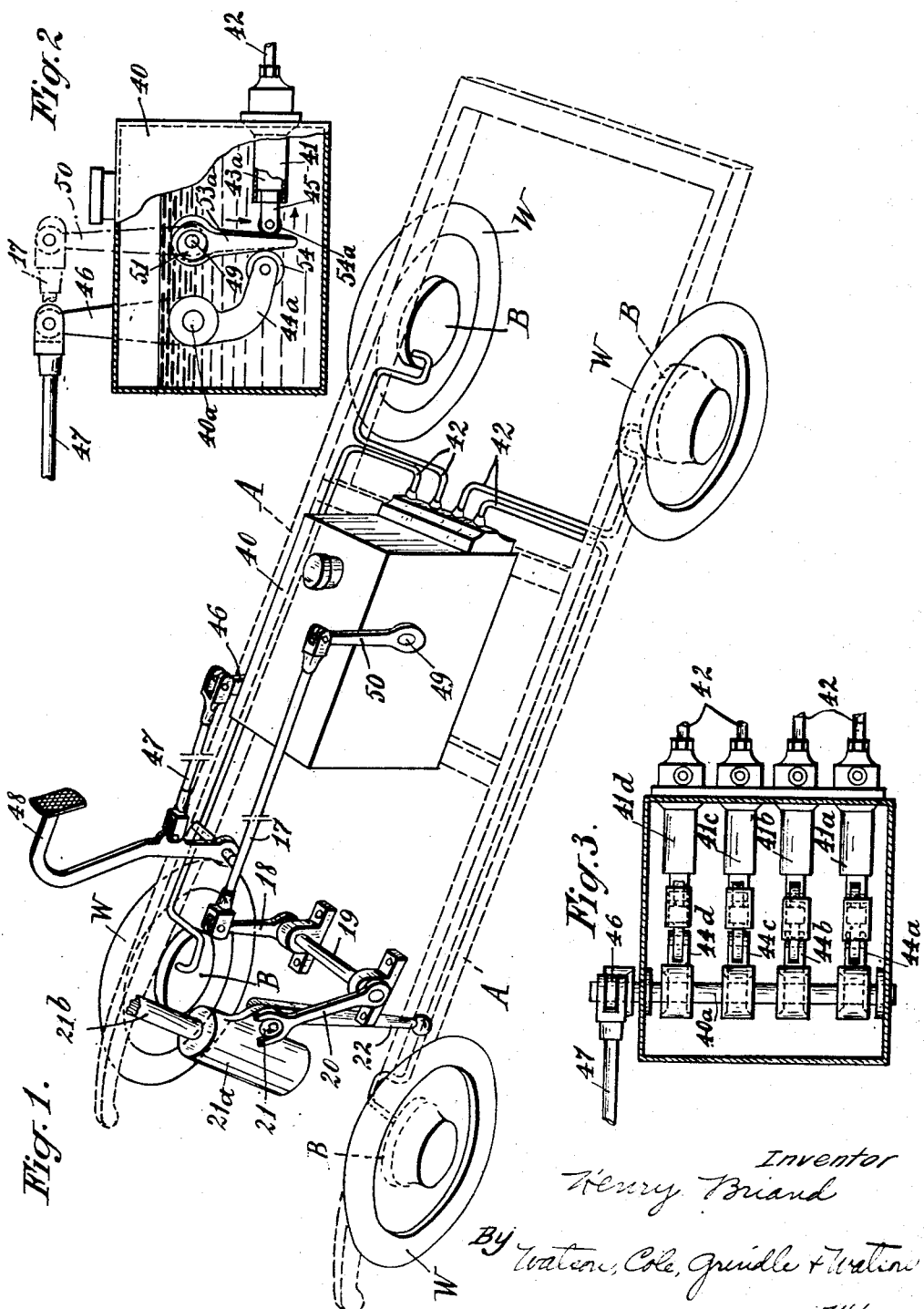

Patented July 23, 1940

2,209,149

UNITED STATES PATENT OFFICE 2,209,149

DEVICE FOR REGULATING THE ACTION OF BRAKES

Henry Briand, Paris, France

Application February 24, 1939, Serial No. 258,311
In France March 2, 1938

6 Claims. (Cl. 188—152)

The present invention relates to devices for regulating the action of brakes and it is more especially, although not exclusively, concerned with the braking systems of automobile vehicles.

In a prior patent application, Ser. No. 118,414, filed December 30, 1936, now Patent 2,169,519, Aug. 15, 1939, I described a device of this kind, in which the individual braking actions on the wheels of the vehicles are respectively varied, when a vehicle is turning a curve, according to the direction in which the vehicle is turning and to the radius of said curve.

The object of the present invention is to provide an improved device of this kind which is especially applicable to the case of hydraulic brakes.

According to the essential feature of the present invention, the brakes are controlled, respectively, through a plurality of individual control members, the number of which is equal to the number of brakes to be regulated, operated by a central or common control member (pedal or lever), and I interpose, between each of said individual control members, respectively, and said central control member, at least one cam, operatively connected with the steering means of the vehicle, so as to modify the amplitudes of the movements of the various individual control members according to the displacement imparted to said steering means and also according to the differences to be obtained between the braking actions applied to the respective wheels of a vehicle, when said vehicle is negotiating a curve.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatic perspective view of a motor-car chassis provided with a braking system regulating device made according to the present invention;

Fig. 2 is a vertical sectional view of the oil reservoir of the braking system of Fig. 1;

Fig. 3 is a plan view corresponding to Fig. 2, the upper wall, or cover, of the reservoir being removed;

Figure 4:
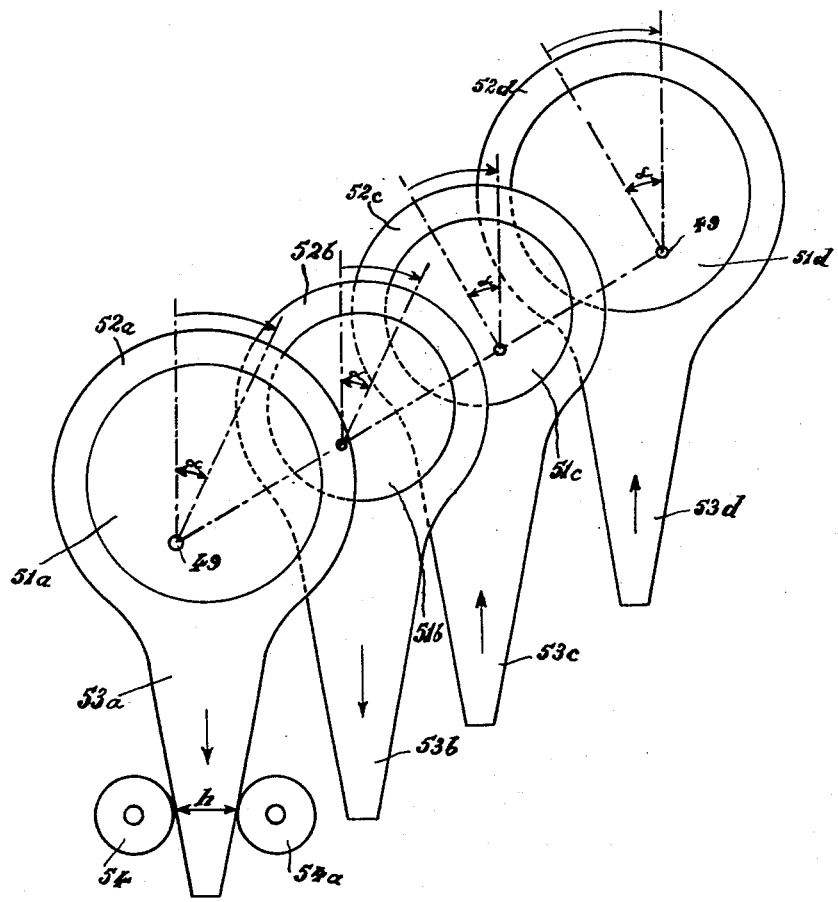

Fig. 4 diagrammatically shows, in perspective view and on an enlarged scale, a detail of the regulating device shown by the above mentioned figures.

In Fig. 1 of the drawings, reference character A designates the chassis-frame of the vehicle, mounted on wheels W provided with brakes B. 21a designates the steering box; 21b is the spindle or shaft of the steering wheel, and 22 is the steering arm, connected, in the known manner, to one of the front wheels of the vehicle, which is, in turn, connected to the other front wheel through coupling means, not shown by the drawings.

As described in the prior patent application above referred to, the spindle of the steering arm 22 carries a cam 21, which acts on a fork-shaped lever 20, pivoted to the frame of the vehicle. This lever 20 acts, through shaft 19 and lever 18, on a rod 17 which transmits to the brake regulating device the rotary displacement of the steering means.

In connection with such a braking system of the hydraulic type, the device according to the invention is made in the following manner:

In the reservoir 40 which contains the liquid (generally oil) used for transmitting the braking action, I provide several cylinders 41, the number of these cylinders being equal to the number of braked wheels the braking of which is to be regulated. The example illustrated by the drawings relates to a vehicle the four wheels of which are braked and, therefore, the reservoir contains four hydraulic cylinders 41a, 41b, 41c, 41d, individually connected to the wheels through conduits 42.

In these cylinders are provided pistons such as 43a, adapted to be actuated by levers 44a, 44b, 44c, 44d, respectively. These last mentioned levers are fixed on a common shaft or spindle 40a. On the other hand, this spindle 40a carries, fixed thereon, a lever 46 linked, through a connecting rod 47, with the brake control member consisting, for instance, in the embodiment shown by the drawings, of pedal 48.

A spindle 49, journalled in reservoir 40 and controlled through a lever 50 operatively connected with rod 17, carries eccentrics 51a, 51b, 51c, 51d, corresponding respectively to the above mentioned cylinders 41a, 41b, 41c, 41d. The annular elements 52a, 52b, 52c, 52d which cooperate with said eccentrics respectively, turning freely with respect thereto, carry wedge-shaped levers 53a, 53b, 53c, 53d. Each of these last mentioned levers is interposed between one of the levers 44a, 44b, 44c, 44d and the rod 45 of the corresponding piston 43a, 43b, 43c, 43d, respectively, the contact between each of said levers and the elements that cooperate therewith being preferably ensured by means of small rollers such as 54 and 54a respectively.

The eccentrics may be arranged in the manner shown by Fig. 4. Eccentrics 51a, and 51d which are associated with pistons 43a and 43d, corresponding to the rear wheels, are of an eccentricity greater than that of eccentrics 51b and 51c, associated with the pistons corresponding to the front wheels.

Furthermore, in the embodiment illustrated by the drawings, the four eccentrics are keyed on spindle 49 in such manner that their respective diameters passing through the axis of said spindle make the same angle α with the vertical or any other fixed direction. But the angle α of the eccentrics 51a and 51b which correspond to the left hand side wheels is of a direction opposed to that of the eccentrics 51c and 51d which correspond to the wheels on the right hand side of the vehicle.

Finally, levers 53a, 53b, 53c, 53d are so arranged and shaped that, in the position of the eccentrics shown by the drawing, which corresponds to the neutral position of the steering means (that is to say with the vehicle running along a straight line) the distance $h$ between the contacting points of levers 54 and 54a is the same for all these levers. Consequently, in the position of shaft 49 shown by Fig. 4, the strokes of the four pistons are equal, which corresponds to transmitting identical braking actions to the four wheels. If, now, the steering wheel is turned toward the left, so that spindle 49 turns in the direction of the arrows of Fig. 4, it is clear that levers 53a and 53b move in a downward direction, whereas levers 53c and 53d move in an upward direction. Owing to the wedge-like shape of these levers, it follows that the two wheels on the left hand side undergo a greater braking action than the two wheels on the right hand side, in the case, above considered, of the vehicle turning toward the left.

Furthermore, as eccentrics 51b, 51c are of smaller eccentricity, the displacements of levers 53b, 53c are of lower amplitude than those of levers 53a, 53d.

Finally, representing by $f$ the braking of each of the wheels of the vehicle when the steering means are in neutral position, by $e$ the braking variation, in one direction or the other, which results, for each of the rear wheels, from a certain angle of rotation of the steering wheel, and by $e_1$ the braking variation which similarly results, for each of the front wheels, from the same angle of rotation of the steering wheel, it follows that, in the order of decreasing actions:

The left rear wheel undergoes a braking equal to $f+e$.
The left front wheel undergoes a braking equal to $f+e_1$.
The right front wheel undergoes a braking equal to $f-e_1$.
The right rear wheel undergoes a braking equal to $f-e$.

Inversely, if the steering wheel is turned in the opposed direction, that is to say toward the right, spindle 49 turns in the direction opposed to that of the arrows of Fig. 4, and the distribution of the braking actions is symmetrical with respect to that above set forth.

It may be of interest to obtain, for the rear wheel located on the outside of the curve, a braking action greater than that exerted on the front wheel located on the same side. In this case, I can adjust the brakes in the ordinary manner such that, along a straight line, the braking actions on the rear wheels are greater than the braking actions on the front wheels.

If, for instance, $f$ designates the braking action exerted, when the vehicle is running along a straight line, on the rear wheels, and $f_1$ the braking action, smaller than the preceding one, exerted on the front wheels, it is possible, for instance when turning the steering wheel toward the left, as in the above example, to obtain the following order of braking of the various wheels, from the wheel which undergoes the highest braking action to the wheel which undergoes the lowest braking action:

Left rear wheel _____ $f+e$
Left front wheel _____ $f_1+e_1$
Right rear wheel _____ $f-e$
Right front wheel _____ $f_1-e_1$ In order to have $f-e$ greater than $f_1-e_1$ $f-f_1$ must be greater than $e-e_1$.

Of course, any desired distribution of the braking efforts might be obtained by giving suitable shapes and curvatures to the outlines of levers 53a, 53b, 53c and 53d, actuated by the eccentrics. In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In a vehicle including a plurality of wheels, hydraulic brakes for said wheels, and steering means for at least some of said wheels, a regulating device of the type described which comprises, in combination, an individual control means for each of said brakes, a central braking control means adapted to operate all of said members simultaneously, a part adjustably inserted between said central control means and each of said individual control means, so that the relative positions of these two last mentioned control means vary in accordance with the position of said parts, individual camming means for operating each of said parts, respectively, and means, operatively connected with said steering means, for simultaneously controlling all of these camming means.

2. In a vehicle including a plurality of wheels, hydraulic brakes for said wheels, and steering means for at least some of said wheels, a regulating device of the type described which comprises, in combination, an individual control means for each of said brakes, a central braking control means adapted to operate all of said members simultaneously, a part adjustably inserted between said central control means and each of said individual control means, said part being wedge-shaped so that the relative positions of these two last mentioned control means vary in accordance with the position of each of said wedge-shaped parts, individual camming means for operating each of said wedge-shaped parts, respectively, and means, operatively connected with said steering means, for simultaneously controlling all of these camming means.

3. In a vehicle including a plurality of wheels, hydraulic brakes for said wheels, and steering means for at least some of said wheels, a regulating device of the type described which comprises, in combination, an individual control means for each of said brakes, a central braking control means adapted to operate all of said members, simultaneously, a part adjustably inserted between said central control means and each of said individual control means, said part being wedge-shaped so that the relative positions of these two last mentioned control means vary in accordance with the position of each of said wedge-shaped parts, annular elements rigid with each of said parts, eccentrics adapted to cooperate with said annular elements, a shaft having all of these eccentrics keyed thereon, and means, operatively connected with said steering means, for turning said shaft about its axis.

4. In a vehicle including a plurality of wheels, hydraulic brakes for said wheels, and steering means for at least some of said wheels, a regulating device of the type described which comprises, in combination, a central reservoir of liquid, a plurality of cylinders in said reservoir, one for each of said brakes, a piston in each of said cylinders, a central braking control means including a plurality of levers, all rigid therewith and each of which is adapted to operate one of said pistons, respectively, a part adjustably inserted between each of said levers and the corresponding piston, said part being wedge-shaped so that the relative positions of each lever and the corresponding piston vary in accordance with the position of the wedge-shaped part inserted between them, individual camming means for operating each of said wedge-shaped parts, respectively, and means, operatively connected with said steering means, for simultaneously controlling all of said camming means.

5. In a vehicle including a plurality of wheels, hydraulic brakes for said wheels, and steering means for at least some of said wheels, a regulating device of the type described which comprises, in combination, a central reservoir of liquid, a plurality of cylinders in said reservoir, one for each of said brakes, a piston in each of said cylinders, a central braking control means, including a plurality of levers all rigid therewith and each adapted to operate one of said pistons, respectively, a part adjustably inserted between each of said levers and the corresponding piston, said part being wedge-shaped so that the relative positions of each lever and the corresponding piston vary in accordance with the position of the wedge-shaped part inserted between them, an annular element rigid with each of said wedge-shaped parts, eccentrics adapted to cooperate with said annular elements, respectively, a shaft having all these eccentrics keyed thereon, and means, operatively connected with said steering means, for turning said shaft about its axis when said steering means are displaced.

6. A system according to claim 5, including four brakes and four eccentrics corresponding thereto and arranged side by side along said shaft, the two eccentrics on the same side of the middle of the shaft having their eccentricities in a direction opposed to that of the eccentricities of the two other eccentrics, located on the other side of the middle of the shaft, the eccentricities of the two middle eccentrics being smaller than those of the two end eccentrics, the eccentrics, named from one end of said shaft toward the other end, corresponding respectively to the rear left wheel, the front left wheel, the front right wheel, and the rear right wheel.

HENRY BRIAND.